(12) United States Patent
Yamamoto et al.

(10) Patent No.: US 11,336,779 B2
(45) Date of Patent: May 17, 2022

(54) INFORMATION PROCESSING APPARATUS, AND NON-TRANSITORY COMPUTER READABLE MEDIUM

(71) Applicant: FUJIFILM Business Innovation Corp., Tokyo (JP)

(72) Inventors: Takuma Yamamoto, Kanagawa (JP); Aya Kuwano, Kanagawa (JP); Mitsuru Sato, Kanagawa (JP); Toru Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 70 days.

(21) Appl. No.: 17/037,746

(22) Filed: Sep. 30, 2020

(65) Prior Publication Data

US 2021/0266416 A1  Aug. 26, 2021

(30) Foreign Application Priority Data

Feb. 26, 2020  (JP) .............................. JP2020-030965

(51) Int. Cl.
*G06F 3/12* (2006.01)
*H04N 1/00* (2006.01)
*G06V 30/148* (2022.01)

(52) U.S. Cl.
CPC ....... *H04N 1/00331* (2013.01); *G06V 30/153* (2022.01); *H04N 1/00644* (2013.01); *H04N 2201/0094* (2013.01)

(58) Field of Classification Search
CPC ........... H04N 1/00331; H04N 1/00644; H04N 2201/0094; G06V 30/153
See application file for complete search history.

(56) References Cited

U.S. PATENT DOCUMENTS

2006/0062473 A1* 3/2006 Moromizato ...... H04N 1/00968
382/190

FOREIGN PATENT DOCUMENTS

JP  2009-294792  12/2009

* cited by examiner

*Primary Examiner* — Moustapha Diaby
(74) *Attorney, Agent, or Firm* — JCIPRNET

(57) ABSTRACT

An information processing apparatus includes a processor configured to: acquire a read image and item information, the read image being an image obtained by reading a paper medium including plural documents, the item information being information of an item specified by a user from among plural items contained in the documents; extract a character string from the read image, the character string being associated with the item information; if a character string contained in a page of the read image and extracted from the page differs from a character string extracted from the previous page immediately preceding the page, set a split position, the split position being a position at which to split out a portion of the read image as a set of documents, the portion being a portion of the read image from a page where extraction has begun to the previous page; and output the read image split in accordance with the split position.

20 Claims, 9 Drawing Sheets

INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-030965 filed Feb. 26, 2020.

BACKGROUND

(i) Technical Field

The present disclosure relates to an information processing apparatus, and a non-transitory computer readable medium.

(ii) Related Art

Japanese Unexamined Patent Application Publication No. 2009-294792 discloses an information processing apparatus capable of communicating with a first external apparatus and a second external apparatus. The first external apparatus stores application information including application-determining information for determining an application. The second external apparatus stores saved image data associated with the application-determining information, in such a way that allows the saved image data to be referenced from the first external apparatus. The information processing apparatus includes an input unit, an identifying unit, a splitting unit, an attribute-data generating unit, and a transfer unit. The input unit is used to input image data, the image data being generated by sequentially reading a form that contains the application-determining information stored in the first external apparatus, and a form that does not contain the application-determining information. The identifying unit identifies the application-determining information included in the form that contains the application-determining information. The splitting unit splits the image data input by using the input unit into individual units of application based on the result of identification performed by the identifying unit. The attribute-data generating unit generates, for each piece of image data split by the splitting unit, attribute data including the corresponding application-determining information. The transfer unit transfers the image data split by the splitting unit to the second external apparatus as the saved image data, and transfers the attribute information generated by the attribute-data generating unit to the second external apparatus.

There exist, for example, information processing apparatuses that perform optical character recognition (OCR) that reads an image of a paper medium document filled out by a user to thereby recognize, from the image of the document, a character string entered by the user.

In some cases, OCR is performed on a batch of paper media into which plural documents are combined. For such cases, a technique exists to identify documents as a set of documents. With this technique, the same character, symbol, and other objects are attached to associated documents in advance, and an image obtained by reading a batch of paper media with the same character, symbol, and other objects attached thereto (to be referred to as "read image" hereinafter) is split into individual sets of documents grouped together for each document type or for each unit of application.

In using the above technique to split a read image obtained by reading a batch of paper media into individual document sets, in order to identify each document set, documents with the same character, symbol, or other objects attached thereto need to be prepared for each document set. This means that the technique does not necessarily reduce the burden associated with splitting documents.

SUMMARY

Aspects of non-limiting embodiments of the present disclosure relate to providing an information processing apparatus and a non-transitory computer readable medium that, in splitting a read image obtained by reading a batch of paper media, make it possible to reduce the burden associated with splitting documents, in comparison to a case where documents with the same character, symbol, and other objects attached thereto are prepared in advance for each set of documents to identify the set of documents.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire a read image and item information, the read image being an image obtained by reading a paper medium including plural documents, the item information being information of an item specified by a user from among plural items contained in the documents; extract a character string from the read image, the character string being associated with the item information; if a character string contained in a page of the read image and extracted from the page differs from a character string extracted from the previous page immediately preceding the page, set a split position, the split position being a position at which to split out a portion of the read image as a set of documents, the portion being a portion of the read image from a page where extraction has begun to the previous page; and output the read image split in accordance with the split position.

BRIEF DESCRIPTION OF THE DRAWINGS

Exemplary embodiments of the present disclosure will be described in detail based on the following figures, wherein.

DETAILED DESCRIPTION

First Exemplary Embodiment

Exemplary embodiments of the present disclosure will be described below in detail with reference to the drawings. The following description is directed to an exemplary case in which an information processing apparatus 10 according to the first exemplary embodiment is a server that manages data obtained by reading a document, a form, and other objects. However, this is not to be construed restrictively. The information processing apparatus 10 may be incorporated in a multifunction machine having print, copy, scan, facsimile, and other functions, or may be incorporated in a terminal such as a personal computer.

Figure 1:
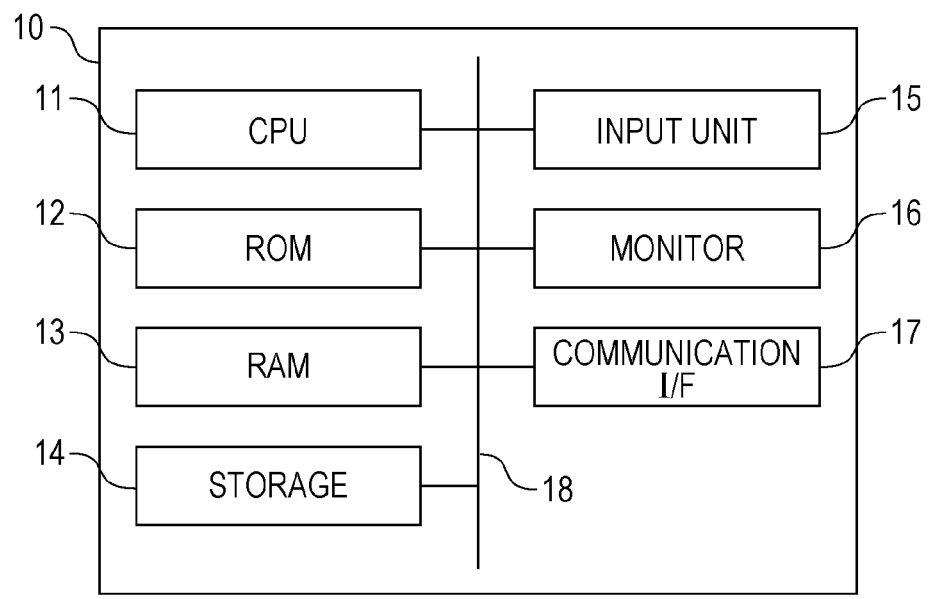
FIG. 1 is a block diagram illustrating an exemplary hardware configuration of an information processing apparatus in accordance with exemplary embodiments.

FIG. 1 is a block diagram illustrating an exemplary hardware configuration of the information processing apparatus 10 in accordance with the first exemplary embodiment. As illustrated in FIG. 1, the information processing apparatus 10 according to the first exemplary embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are interconnected by a bus 18. The CPU 11 is an example of a processor.

The CPU 11 controls the entire information processing apparatus 10 in a centralized manner. The ROM 12 stores various programs including an information processing program used in the first exemplary embodiment. The RAM 13 is a memory used as a work area during execution of various programs. The CPU 11 loads a program stored in the ROM 12 into the RAM 13, and executes the program to carry out the process of extracting a character from image data, and storing the extracted character. The storage 14 is, for example, a hard disk drive (HDD), a solid state drive (SSD), or a flash memory. The storage 14 may store an information processing program or other information. The input unit 15 is a keyboard or a mouse to receive input of a character or other information. The monitor 16 displays image data or other information. The communication I/F 17 transmits and receives data.

Figure 2:
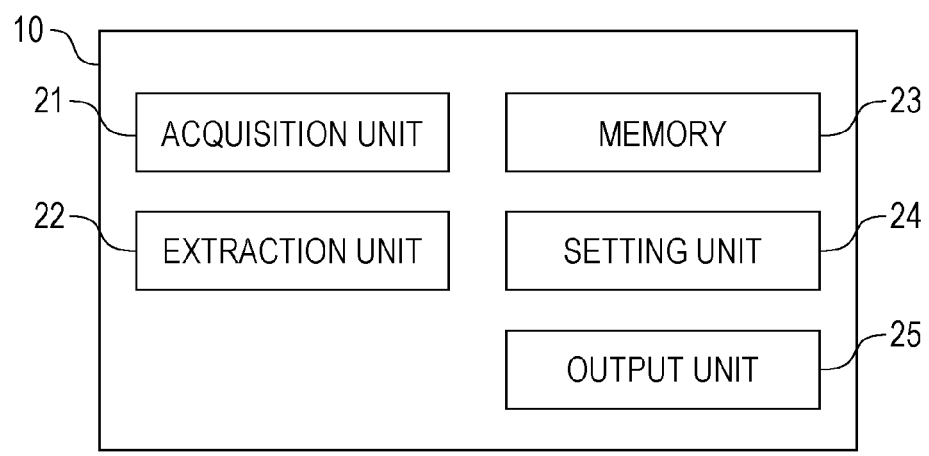
FIG. 2 is a block diagram illustrating an exemplary functional configuration of an information processing apparatus in accordance with exemplary embodiments.

The functional configuration of the information processing apparatus 10 will be described below with reference to FIG. 2. FIG. 2 is a block diagram illustrating an exemplary functional configuration of the information processing apparatus 10 in accordance with the first exemplary embodiment.

As illustrated in FIG. 2, the information processing apparatus 10 includes an acquisition unit 21, an extraction unit 22, a memory 23, a setting unit 24, and an output unit 25. By executing an information processing program, the CPU 11 functions as the acquisition unit 21, the extraction unit 22, the memory 23, the setting unit 24, and the output unit 25.

The acquisition unit 21 acquires an image obtained by reading a paper medium including plural documents (to be referred to as "read image" hereinafter), and information of an item specified by a user from among items contained in the documents (to be referred to as "item information" hereinafter). The acquisition unit 21 acquires the following pieces of information: a user-specified preset value of the maximum number of pages of one set of documents, and a user-specified preset value of the maximum number of copies of one set of documents; a user-specified split position at which to split out a set of documents; and an extraction region from which to extract a character string.

The following description of the first exemplary embodiment is directed to a case in which items and character strings written in each document are extracted from a read image through OCR. In this regard, examples of items include items written in a document and representing information to be entered by a user, such as "name" and "address", and examples of character strings include the user's own name, the user's own address, and other such character strings entered by the user. As used in the first exemplary embodiment, the terms "set of documents" and "document set" refer to a suite of multiple-page documents submitted by the same person.

The extraction unit 22 uses item information to extract, from a read image, a character string associated with an item included in the read image. The extraction unit 22 also extracts a region where the extracted character string is located.

The memory 23 stores a split read image, a character string acquired from the read image, and a region from which the character string has been extracted.

The setting unit 24 sets a split position if a character string contained in a page of the read image and extracted from the page differs from a character string extracted from the previous page immediately preceding the page, the split position being a position at which to split out a portion of the read image as a set of documents, the portion being a portion of the read image from a page where extraction has begun to the previous page.

The output unit 25 outputs the read image split in accordance with the split position.

Before describing operation of the information processing apparatus 10, a description will now be given with reference to FIGS. 3 to 6 of a method according to the first exemplary embodiment for setting a split position.

Figure 3:
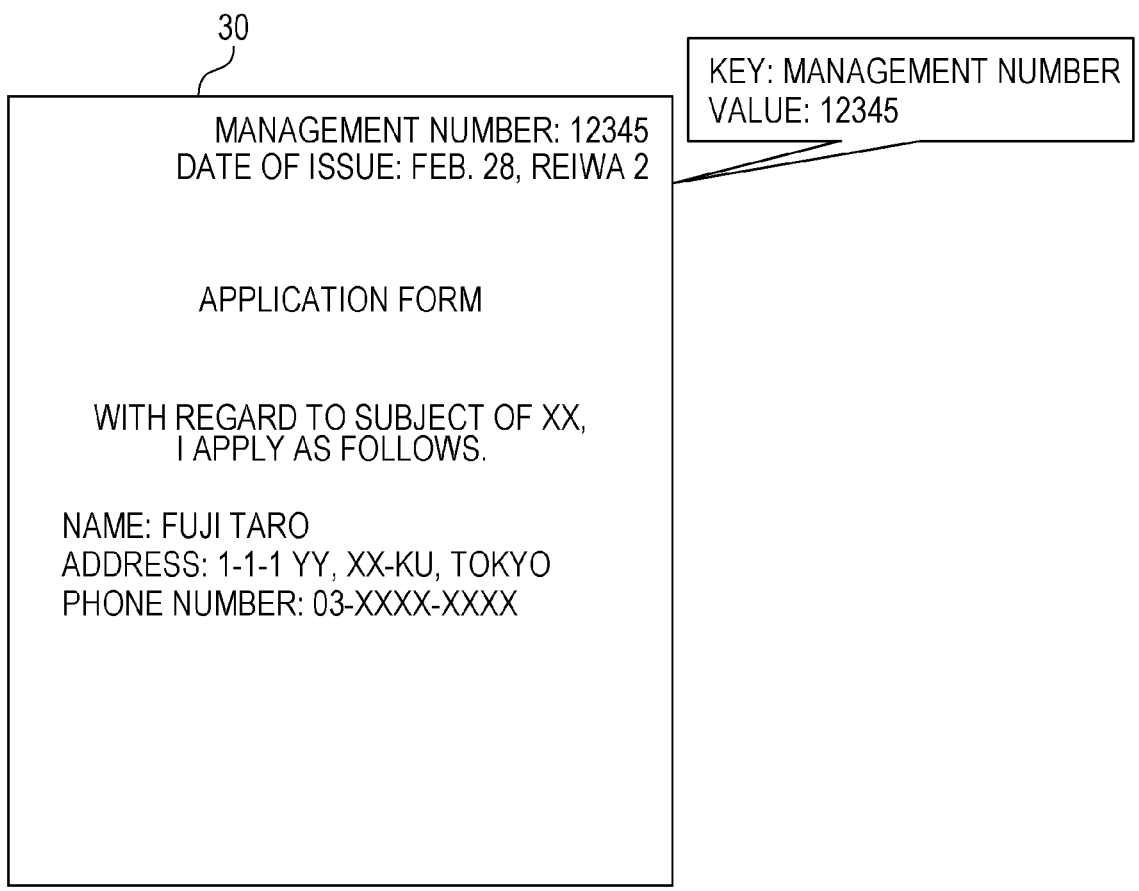
FIG. 3 illustrates an exemplary read document in accordance with exemplary embodiments.
Figure 4:
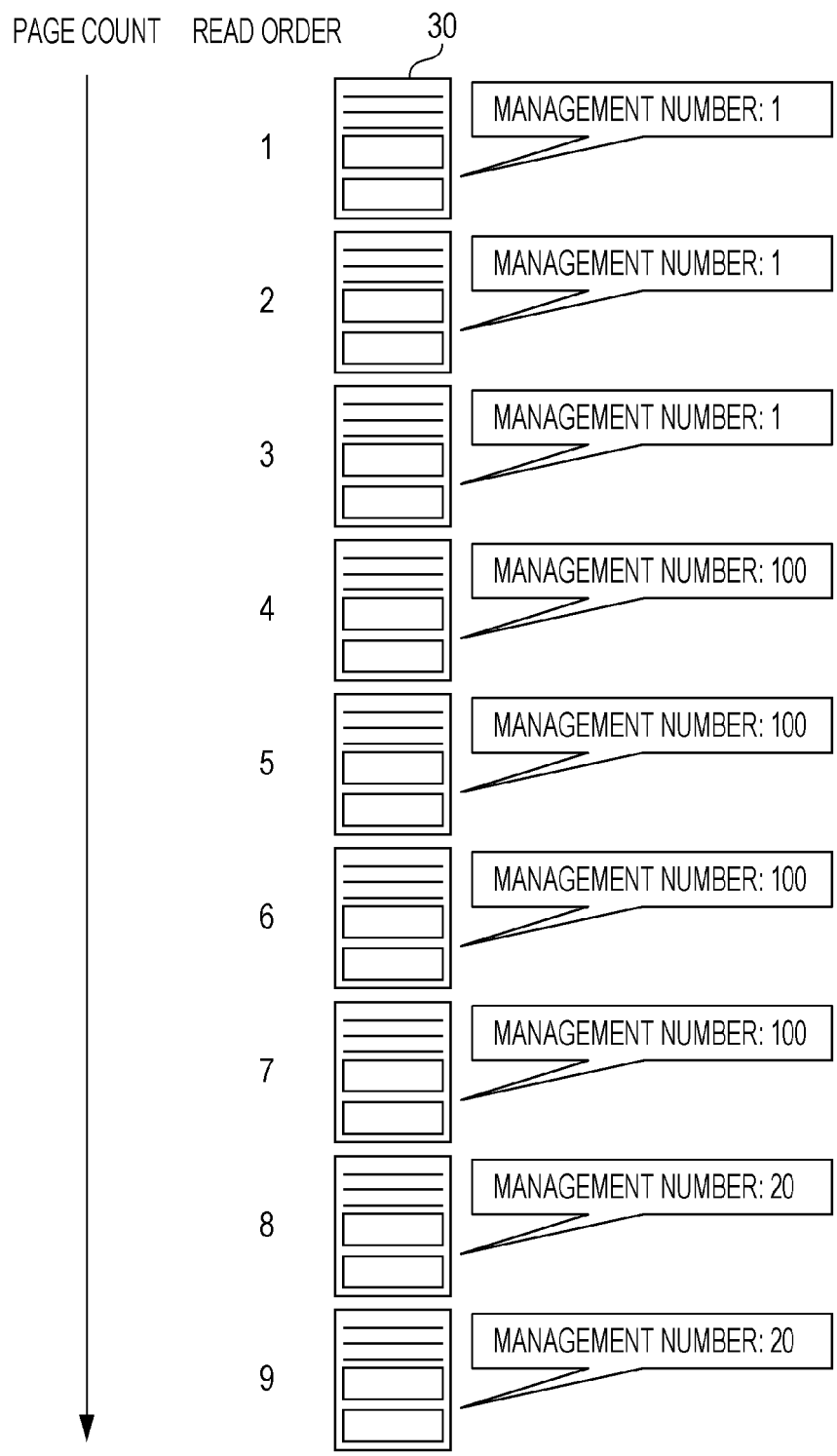
FIG. 4 schematically illustrates exemplary documents used to explain split positions in accordance with a first exemplary embodiment.

Now, with reference to FIGS. 3 and 4, setting of a split position will be described first. FIG. 3 schematically illustrates an exemplary document that has been read in accordance with the first exemplary embodiment. FIG. 4 schematically illustrates exemplary documents used to explain how individual split positions are set in accordance with the first exemplary embodiment.

For instance, as illustrated in FIG. 3, a document includes the following items: management number, date of issue, name, address, and phone number. A character string is written beside each corresponding item, as in "management number: 12345". In response to "management number" being specified by the user as an item to be extracted, the information processing apparatus 10 extracts, from the result of OCR performed on a read image obtained by reading the document, the character string "12345" written beside the item "management number". Specifying an item in advance, and extracting a character string associated with the specified item in this way is called "key-value extraction". The following description of the first exemplary embodiment is directed to extraction of a character string (value) corresponding to an item (key) written in each individual document. For key-value extraction, the relative position of a character string associated with an item (the positional relationship between an item and a character string) needs to be set in advance. The following description of the first exemplary embodiment is directed to a case in which a setting is made so as to extract a character string located to the right of an item.

The information processing apparatus 10 acquires a read image, which is an image obtained by reading plural documents, and item information representing a user-specified item to be extracted.

The information processing apparatus 10 extracts, from the read image, an item related to the item information, and a character string associated with the item, and stores the extracted item and the extracted character string. For example, in response to "management number" being specified as item information, the information processing apparatus 10 extracts "12345" written to the right of the item "management number", and stores the extracted character string as an object to be compared with a management number appearing on the second or subsequent pages. Such a character string stored for the purpose of comparison will be referred to as "comparison object" hereinafter.

As illustrated in FIG. 4, the information processing apparatus 10 extracts a character string associated with a management number from each of the images of documents contained in the read image, and compares the extracted character string with a stored comparison object. For example, a case is considered in which the image of the document on the third page has a management number "1", and the image of the document on the fourth page has a management number "100". In this case, the information processing apparatus 10 regards the first to third pages as one set of documents, stores the page numbers of these pages, and sets a split position. Further, the information processing apparatus 10 stores the extracted management number "100" as a comparison object. The information processing apparatus 10 then resumes the extraction of a character string from the fifth page, which is the page immediately following the page containing the last extracted character string, and performs comparison of management numbers.

If the information processing apparatus 10 fails to extract a management number as a character string from a page, the information processing apparatus 10 continues processing while skipping the page from which no management number has been successfully extracted. In this way, associated pages are combined into a set of documents. Specifically, if a character string on the first page and a character string on the third page are the same, then it is assumed that a character string on the second page is also the same. Thus, even if no character string has been successfully extracted from the second page, the first to third pages are combined into a set of documents.

In some cases, however, if there are plural successive pages from which no character string has been successfully extracted, this may result in plural sets of documents being combined into one. In this case, by previously setting an upper limit to the number of pages of one document set, it is possible to prevent plural document sets from being combined into one. Specifically, the information processing apparatus 10 acquires a user-specified value of the maximum number of pages of one document set, and sets the acquired value as a preset value. If the number of pages of a document set exceeds the preset value, the information processing apparatus 10 sets a split position with the documents up to the immediately preceding page being split out as one document set.

The foregoing description of the first exemplary embodiment is directed to a case in which, to deal with a situation where there are plural successive pages from which no character string has been successfully extracted, the process of setting a split position is continued with such pages skipped. However, this is not to be construed restrictively. In one alternative example, if there are plural successive pages from which no character string has been successfully extracted, the process of setting a split position may be stopped, and the user may be notified to that effect. In another alternative example, if the process of setting a split position has been stopped, the user may be made to enter a character string to thereby continue the process of setting a split position, or a notification that processing will be executed from the reading of documents may be provided to the user.

The foregoing description of the first exemplary embodiment is directed to a case in which the maximum number of pages, which is an upper limit number of pages of one document set, is set as a preset value. However, this is not to be construed restrictively. A preset value to be set may be an upper limit number of pages from which no character string has been successfully extracted. Alternatively, such a preset value may be the maximum number of copies representing an upper limit number of copies of one document set contained in a read image. For example, in some cases, if the information processing apparatus 10 extracts an item different from an expected item, a split position is set at an unintended position, and this results in an excessive number of split positions being set. In this case, setting an upper limit to the number of copies of one document set allows for earlier detection of setting of an excessive number of split positions.

The foregoing description of the first exemplary embodiment is directed to a case in which an extracted character string is stored. However, this is not to be construed restrictively. Alternatively, a region from which a character string has been extracted may be stored. In this regard, an extracted character string is expected to be placed at the same position in each individual document. Accordingly, from a position where a character string has been extracted, a region including the character string is determined, and the determined region is stored. Then, a character string is extracted from the stored region in each individual document, thus facilitating extraction of the character string. In this regard, a region including a character string is an example of "extraction region".

If a single page includes plural extraction regions from which character strings have been extracted, priorities may be set for individual regions, and extraction of character strings may be performed in accordance with the priorities. Such priorities may be specified by the user. Alternatively, by using the results of extraction carried out in the past on the same document, the priorities for individual regions may be set in descending order of the number of extractions. If a single page includes plural extraction regions from which character strings have been extracted, a user's specification of a region from which to extract a character string may be accepted.

Figure 5:
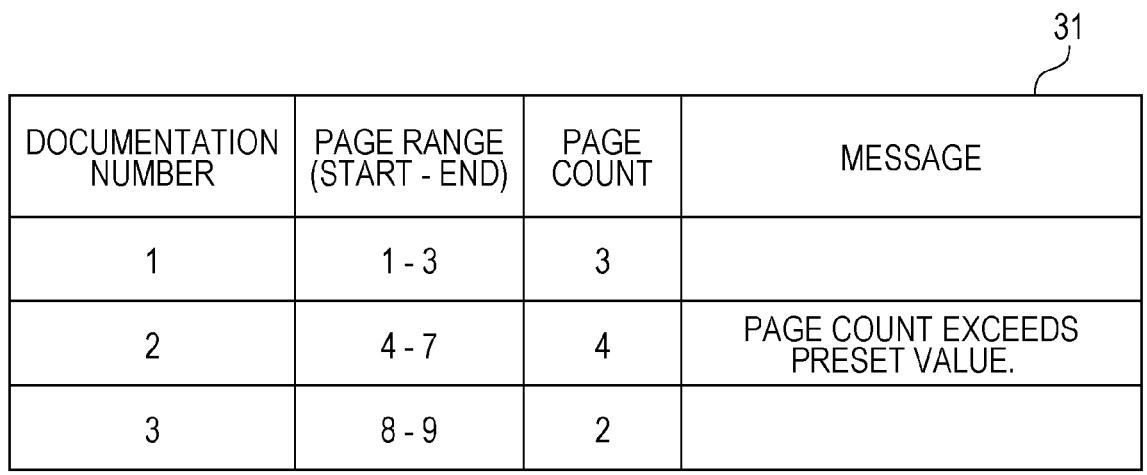
FIG. 5 schematically illustrates exemplary page ranges each representing a split position in accordance with exemplary embodiments.
Figure 6:
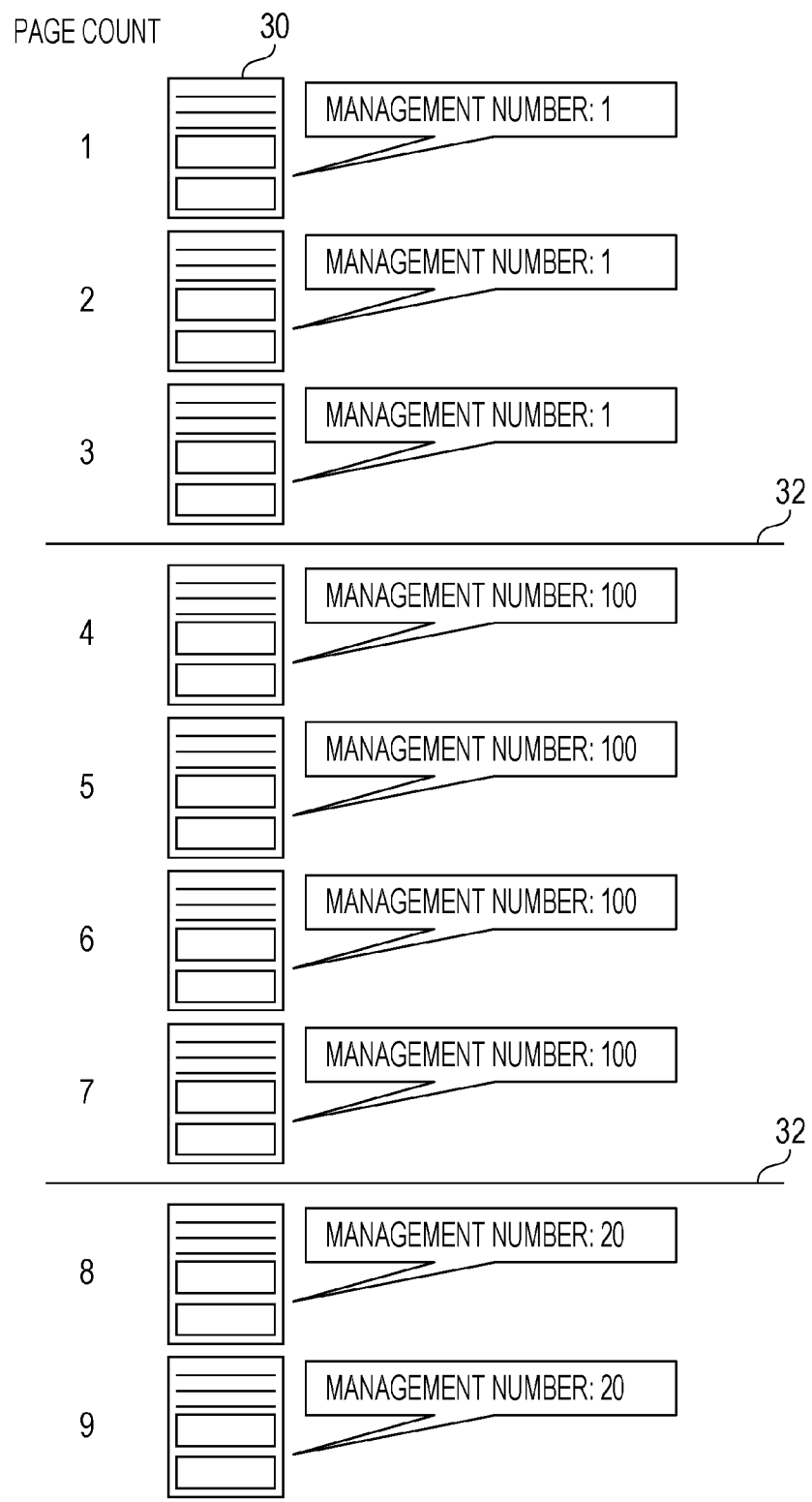
FIG. 6 schematically illustrates how individual split positions and individual document sets are displayed in accordance with exemplary embodiments.

A description will now be given with reference to FIGS. 5 and 6 of a method for displaying split documents. FIG. 5 schematically illustrates exemplary page ranges each representing a split position in accordance with the first exemplary embodiment. FIG. 6 schematically illustrates how individual split positions and individual document sets are displayed in accordance with the first exemplary embodiment.

First, with reference to FIG. 5, the following describes an example of how the page range of each split-out set of documents is displayed.

For example, as illustrated in FIG. 5, the information processing apparatus 10 includes a split-position display region 31. The split-position display region 31 shows "documentation number", "page range", "page count", and "message". A documentation number represents a number uniquely assigned to each individual split-out document set. A page range represents the start and end pages of each document set contained in documents acquired as a read image. A page count represents the number of pages of each document set. A message represents a character string used to notify the user if, for example, a preset value has been exceeded for the corresponding document set.

As illustrated in FIG. 5, in accordance with a split position that has been set, the information processing apparatus 10 displays, for each document set, a page range, a page count, and a message for presentation to the user. If, in setting a split position, a preset value has been exceeded, the information processing apparatus 10 provides notification in the form of a message indicating that the preset value has been exceeded.

The foregoing description of the first exemplary embodiment is directed to a case in which notification is provided if a preset value has been exceeded. However, this is not to be construed restrictively. In one alternative example, if a preset value has been exceeded, processing may be stopped. In another alternative example, if a preset value has been exceeded, processing may be stopped, and notification of a preset value being exceeded may be provided. In another alternative example, if a preset value has been exceeded, a user's specification of a split position may be accepted for a set of documents for which the present value has been exceeded.

The foregoing description of the first exemplary embodiment is directed to a case in which a page range, a page count, and a message are displayed in association with a split position. However, this is not to be construed restrictively. In one alternative example, in accordance with a page range, a read image may be split, and the result may be displayed on a monitor. In another alternative example, a read image may be split, and the result may be transmitted to a server or other such device installed in a different location. In another alternative example, a split position that has been set may be displayed together with a read image. For example, as illustrated in FIG. 6, the information processing apparatus 10 may display a list of acquired read images 30, and each split position 32.

As illustrated in FIG. 6, the information processing apparatus 10 displays, on the monitor 16, each read image 30, and each split position 32 that has been set. Further, the information processing apparatus 10 may, in response to an instruction from the user, accept correction, addition, or deletion of the set split position 32.

Figure 7:
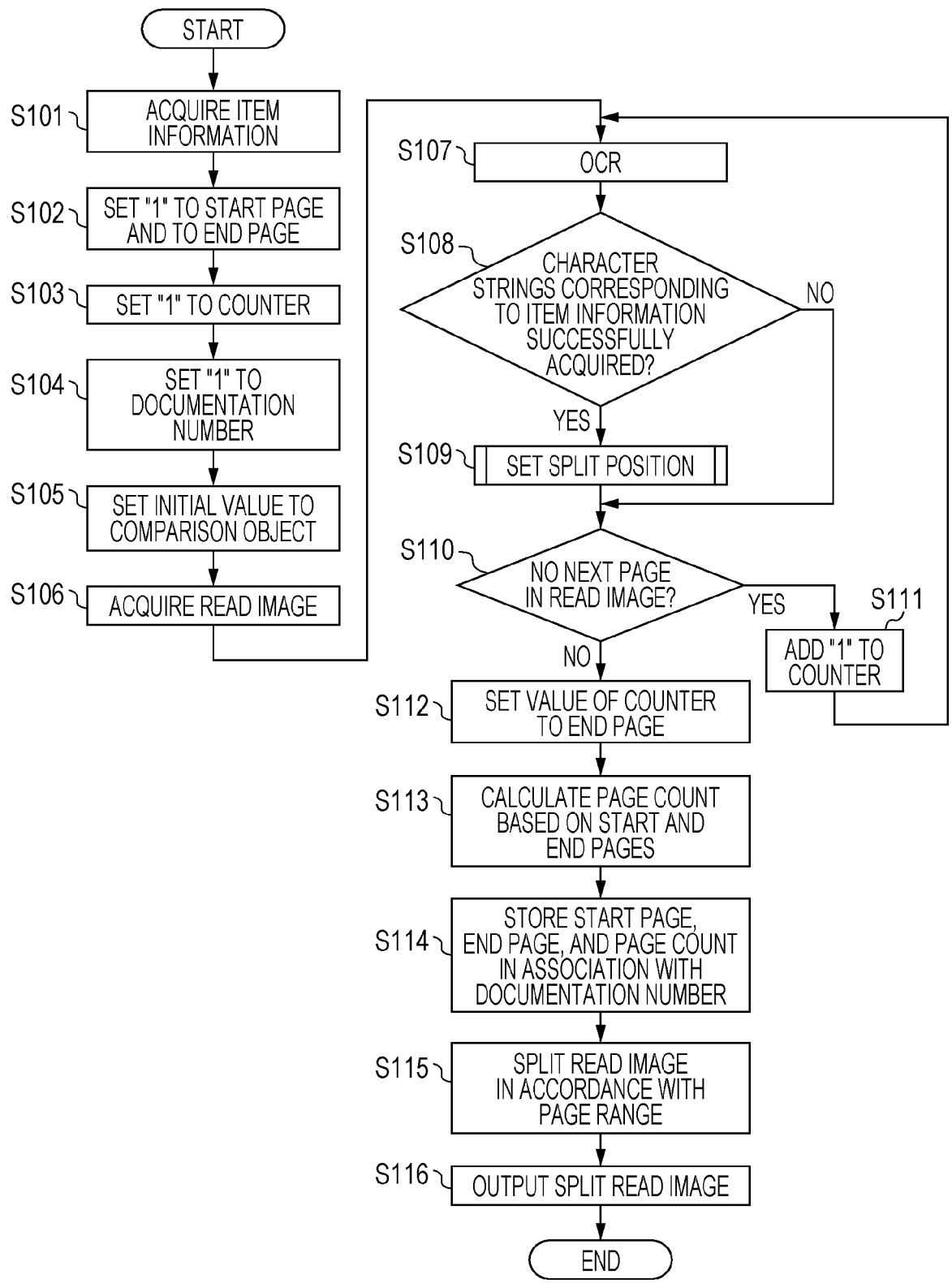
FIG. 7 is a flowchart illustrating exemplary information processing in accordance with exemplary embodiments.
Figure 8:
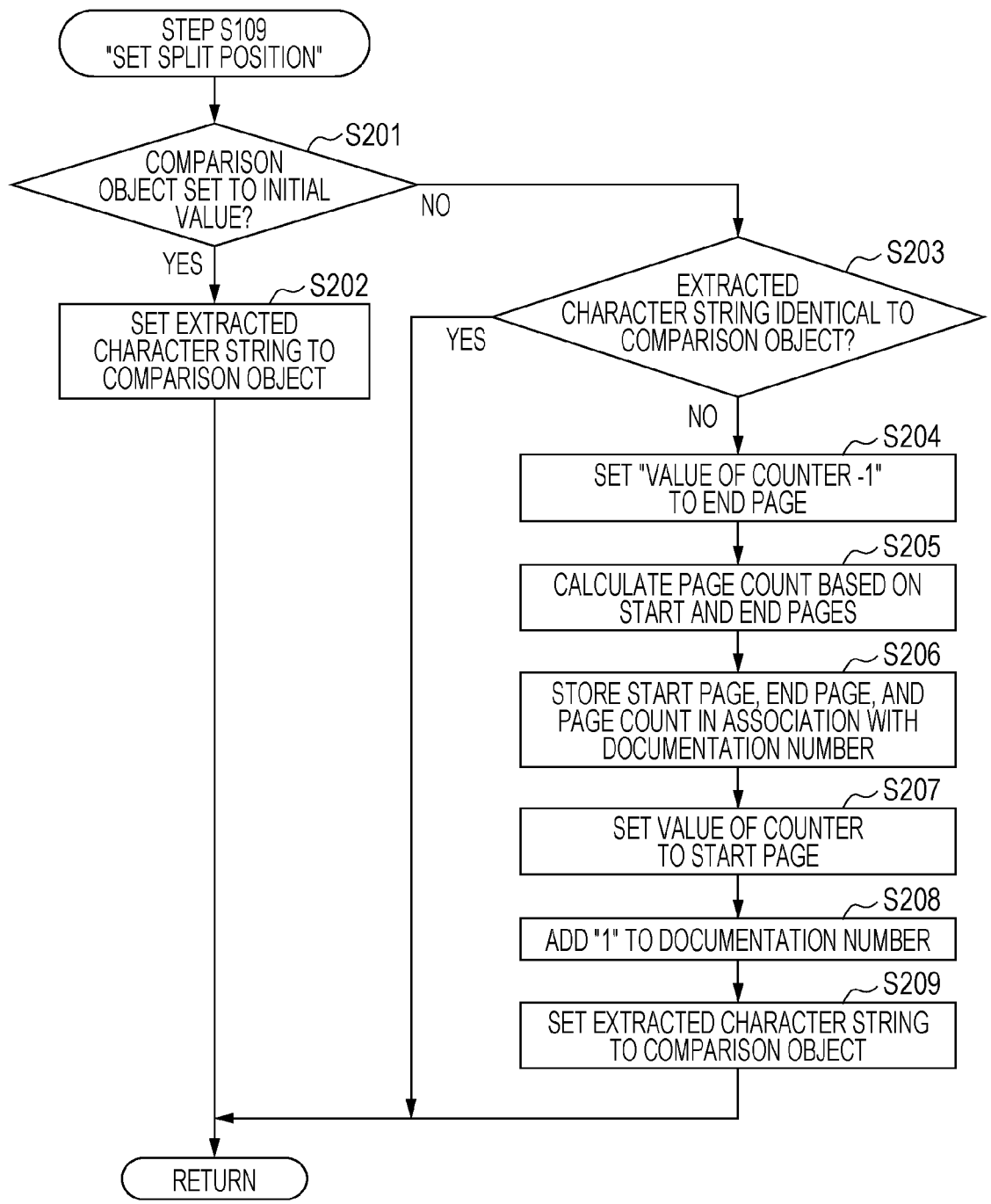
FIG. 8 is a flowchart illustrating an exemplary split-position setting process in accordance with the first exemplary embodiment.

A description will now be given with reference to FIGS. 7 and 8 of operation of an information processing program according to the first exemplary embodiment. FIG. 7 is a flowchart illustrating exemplary information processing in accordance with the first exemplary embodiment. The information processing illustrated in FIG. 7 is executed by the CPU 11 reading the information processing program from the ROM 12 or the storage 14 and executing the program. The information processing in FIG. 7 is executed in response to, for example, the user inputting an instruction that the information processing program be executed.

At step S101, the CPU 11 acquires item information specified by the user.

At step S102, the CPU 11 sets "1" an initial value to the start page and to the end page.

At step S103, the CPU 11 sets "1" to the counter.

At step S104, the CPU 11 sets "1" to the documentation number.

At step S105, the CPU 11 sets an initial value to a comparison object.

At step S106, the CPU 11 acquires a read image, which is a document image to be read.

At step S107, the CPU 11 executes OCR on an image of documents with a preset number of pages, and acquires an item and a character string from the read image.

At step S108, the CPU 11 determines whether a character string corresponding to the item information has been successfully extracted from the read image. If a character string corresponding to the item information has been successfully extracted (step S108: YES), the CPU 11 transfers to step S109. If a character string corresponding to the item information has not been successfully extracted (step S108: NO), the CPU 11 transfers to step S110.

At step S109, the CPU 11 performs a split-position setting process. The split-position setting process will be described later in detail with reference to FIG. 8.

At step S110, the CPU 11 determines whether the read image has no next page. If the read image has no next page (step S110: NO), the CPU 11 transfers to step S112. If the read image has the next page (step S110: YES), the CPU 11 transfers to step S111.

At step S111, the CPU 11 adds "1" to the counter, and then transfers to step S107.

At step S112, the CPU 11 sets the value of the counter to the end page.

At step S113, the CPU 11 calculates the page count based on the start and end pages.

At step S114, the CPU 11 stores the start page, the end page, and the page count in association with the documentation number.

At step S115, the CPU 11 splits the read image in accordance with the page range (the start page and the end page).

At step S116, the CPU 11 outputs the split read image.

A description will now be given with reference to FIG. 8 of operation of a split-position setting processing program according to the first exemplary embodiment. FIG. 8 is a flowchart illustrating an exemplary split-position setting process in accordance with the first exemplary embodiment. The information processing illustrated in FIG. 8 is executed by the CPU 11 reading the split-position setting processing program from the ROM 12 or the storage 14 and executing the program. The split-position setting process in FIG. 8 is executed in response to, for example, input of an instruction to execute the split-position setting processing program from the information processing program.

At step S201, the CPU 11 determines whether an initial value has been set to the comparison object. If an initial value has been set to the comparison object (step S201: YES), the CPU 11 transfers to step S202. If an initial value has not been set to the comparison object (step S201: NO), the CPU 11 transfers to step S203.

At step S202, the CPU 11 sets the extracted character string to the comparison object.

At step S203, the CPU 11 determines whether the extracted character string, and the comparison object are the same. If the extracted character string and the comparison object are the same (step S203: YES), the CPU 11 terminates the split-position setting process. If the extracted character and the comparison object are not the same (step S203: NO), the CPU 11 transfers to step S204.

At step S204, the CPU 11 sets "counter value −1" to the end page.

At step S205, the CPU 11 calculates the number of pages based on the start and end pages.

At step S206, the CPU 11 stores the start page, the end page, and the page count in association with the documentation number.

At step S207, the CPU 11 sets the value of the counter to the start page.

At step S208, the CPU 11 adds "1" to the documentation number.

At step S209, the CPU 11 sets the extracted character string to the comparison object.

As described above, a split position is set for each set of documents through key-value extraction. Therefore, in comparison to previously preparing documents with the same character, symbol, and other objects attached thereto for each set of documents to identify the set of documents, the configuration according to the first exemplary embodiment may reduce the burden associated with splitting documents.

Second Exemplary Embodiment

The foregoing description of the first exemplary embodiment is directed to a case in which, for each of documents arranged in sequential order, a comparison object, and an extracted character string associated with an item are compared with each other in setting a split position. The following description of a second exemplary embodiment is directed to a case in which, for documents that are mixed up with each other, a character string extracted in the past, and an extracted character string associated with an item are compared with each other in setting a split position. The hardware configuration (see FIG. 1) of the information processing apparatus 10 according to the second exemplary embodiment, the functional configuration (see FIG. 2) of the information processing apparatus 10, and the schematic illustration (see FIG. 3) of a document are the same as those in the first exemplary embodiment, and thus will not be described in further detail. Further, the schematic illustration (see FIG. 4) of documents used to explain setting of each split position according to the second exemplary embodiment, the schematic illustration (see FIG. 5) of page ranges each representing a split position according to the second exemplary embodiment, and the schematic illustration (see FIG. 6) of each split position and each set of documents are the same as those in the first exemplary embodiment, and thus will not be described in further detail. The flowchart (see FIG. 7) of information processing according to the second exemplary embodiment is identical to that of the first exemplary embodiment, and thus will not be described in further detail.

Figure 9:
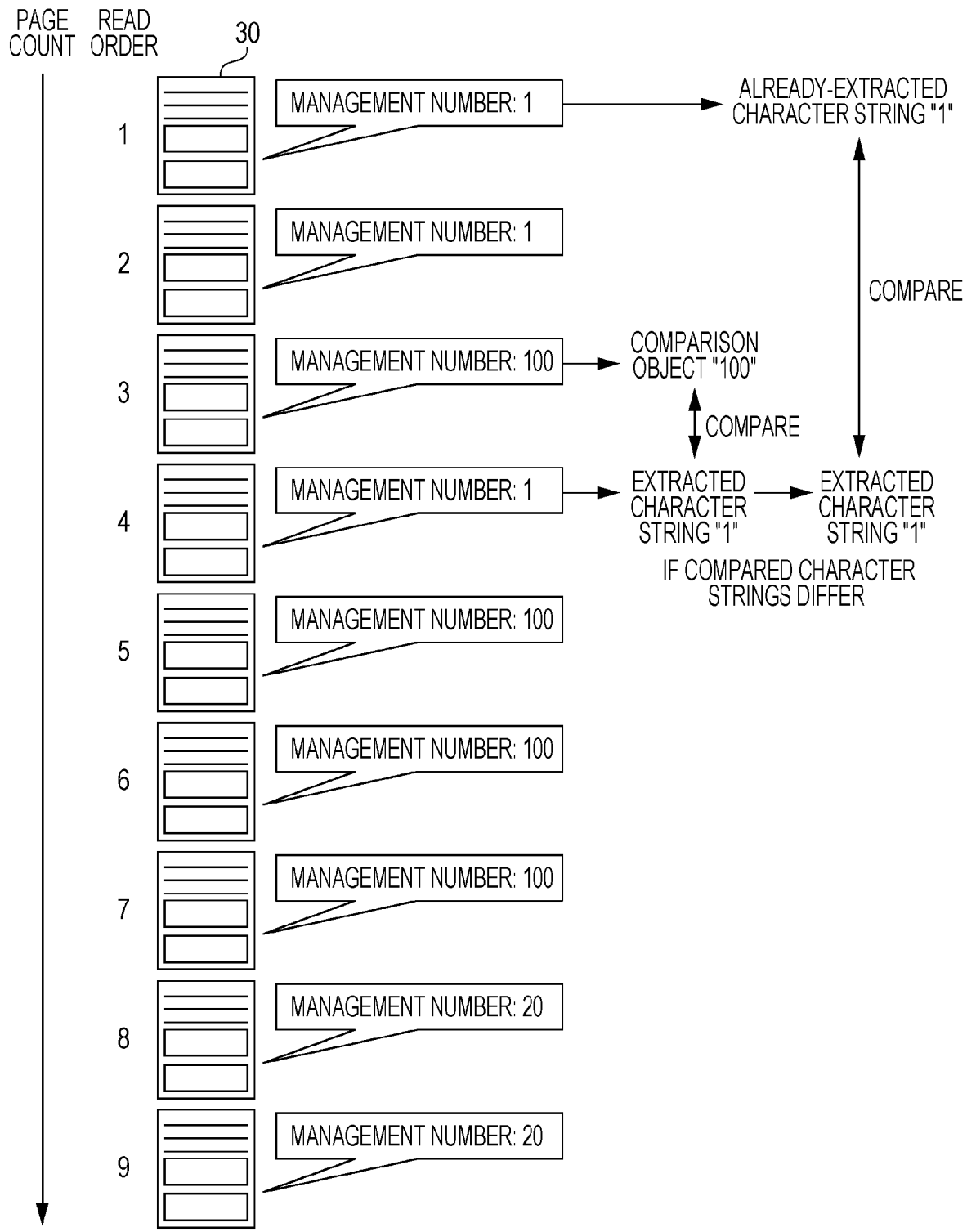
FIG. 9 schematically illustrates exemplary documents used to explain how individual split positions are set in accordance with a second exemplary embodiment.

Before describing operation of the information processing apparatus 10, a description will now be given with reference to FIG. 9 of a method according to the second exemplary embodiment for setting a split position. FIG. 9 schematically illustrates exemplary documents used to explain how individual split positions are set in accordance with the second exemplary embodiment.

A case is now considered in which a character string associated with each item is extracted, and character strings extracted from the images of individual documents are compared with each other in setting a split position. In this case, if the order of documents is mixed up, this may result in an excessive number of split positions being set.

For instance, as illustrated in FIG. 9, each of the third to fifth pages has a different management number from the previous page immediately preceding the page. This results in a split position being set for each single page. To address this, a management number associated with a set of documents split out in the past is stored, and the stored management number is compared with an extracted management number to thereby detect whether documents are mixed up.

Specifically, a case is now considered in which, as illustrated in FIG. 9, a management number "100" on the third page is extracted, and a split position is set accordingly. In this case, the information processing apparatus 10 stores a management number "1", which is previously stored as a comparison object, and the split-out set of documents (the documents on the first and second pages) in association with each other. The extracted management number "100" is also stored as a comparison object. Hereinafter, a comparison object (character string) stored in association with a split-out set of documents will be referred to as "already-extracted character string".

The information processing apparatus 10 extracts a management number "1" on the fourth page, and in response to determining that the extracted management number "1" differs from the management number "100" representing a stored comparison object, the information processing apparatus 10 then compares the management number "1", which represents an already-extracted character string, with the extracted management number "1". In response to determining that the management number "1" representing an already-extracted character string, and the extracted management number "1" are the same, the information processing apparatus 10 stores, in association with the split-out set of documents, the document on the fourth page from which the extracted management number has been extracted.

In other words, if a comparison object and an extracted character string are different, then an already-extracted character string and the extracted character string are compared with each other to detect whether documents are mixed up.

Figure 10:
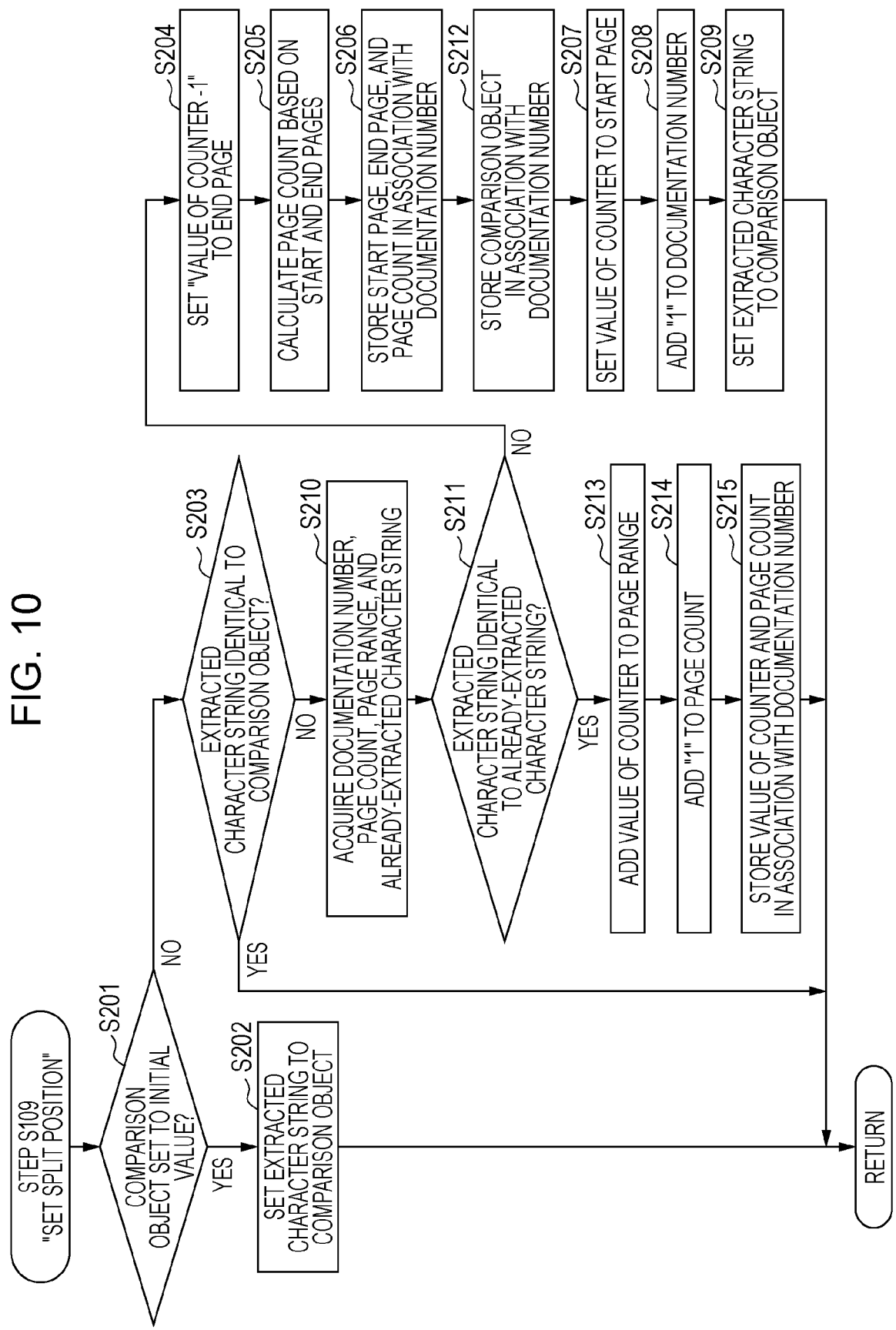
FIG. 10 is a flowchart illustrating an exemplary split-position setting process in accordance with the second exemplary embodiment.

A description will now be given with reference to FIG. 10 of operation of a split-position setting processing program according to the second exemplary embodiment. FIG. 10 is a flowchart illustrating an exemplary split-position setting process in accordance with the second exemplary embodiment. The information processing illustrated in FIG. 10 is executed by the CPU 11 reading the split-position setting processing program from the ROM 12 or the storage 14 and executing the program. The split-position setting process in FIG. 10 is executed in response to, for example, input of an instruction to execute the split-position setting processing program from the information processing program. Steps in FIG. 10 identical to those of the information processing illustrated in FIG. 8 will be denoted by reference signs identical to those illustrated in FIG. 8, and thus will not be described in further detail.

At step S203, the CPU 11 determines whether the extracted character string, and the comparison object are the same. If the extracted character string and the comparison object are the same (step S203: YES), the CPU 11 terminates the split-position setting process. If the extracted character and the comparison object are not the same (step S203: NO), the CPU 11 transfers to step S210.

At step S210, the CPU 11 acquires the following pieces of stored information: a documentation number, a page count, a page range (the start page and the end page), and an already-extracted character string.

At step S211, the CPU 11 determines whether the extracted character string and the already-extracted character string are the same. If the extracted character strings and the already-extracted character string are the same (step S211: YES), the CPU 11 transfers to step S213. If the extracted character and the already-extracted character string are not the same (step S211: NO), the CPU 11 transfers to step S204.

At step S212, the CPU 11 stores, as an already-extracted character string, the comparison object in association with the documentation number.

At step S213, the CPU 11 adds the value of the counter to the acquired page range.

At step S214, the CPU 11 adds "1" to the acquired page count.

At step S215, the CPU 11 stores the value of the counter, and the page count in association with the documentation number.

The foregoing description of the second exemplary embodiment is directed to a case in which if documents are mixed up, associated documents are combined into one set of documents. However, this is not to be construed restrictively. Alternatively, in response to detecting a mix-up of documents, processing may be stopped, and the user may be notified that the documents are not in their proper order or that the documents are mixed up.

As described above, by storing an extracted character string in association with a split-out set of documents, documents are split into individual sets of documents even if the documents are mixed up. Therefore, in comparison to previously preparing documents with the same character, symbol, and other objects attached thereto for each set of documents to identify the set of documents, the configuration according to the seconding exemplary embodiment may reduce the burden associated with splitting documents.

The configuration of the information processing apparatus 10 described with reference to the above exemplary embodiments is only illustrative, and may be modified according to the circumstances without departing from the scope of the present disclosure.

The procedure for processing executed by each program described with reference to the above exemplary embodiments is also only illustrative. Unnecessary steps may be removed, new steps may be added, or the order of processing may be changed, without departing from the scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application-Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiment above, and may be changed.

Although the foregoing description of the exemplary embodiments is directed to a case in which the program for processing information is pre-stored (pre-installed) in the storage 14, this is not to be construed restrictively. The program may be provided while being stored in a storage medium, examples of which include a compact disc read only memory (CD-ROM), a digital versatile disc read only memory (DVD-ROM), and a universal serial bus (USB) memory. Alternatively, the program may be downloaded from an external apparatus via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to
acquire a read image and item information, the read image being an image obtained by reading a paper medium including a plurality of documents, the item information being information of an item specified by a user from among a plurality of items contained in the plurality of documents,
extract a character string from the read image, the character string being associated with the item information,
if a character string contained in a page of the read image and extracted from the page differs from a character string extracted from a previous page immediately preceding the page, set a split position, the split position being a position at which to split out a portion of the read image as a set of documents, the portion being a portion of the read image from a page where extraction has begun to the previous page, and
output the read image split in accordance with the split position.

2. The information processing apparatus according to claim 1,
wherein the processor is further configured to acquire a preset value of at least one of a maximum number of pages of the set of documents and a maximum number of copies of the set of documents, and to, in response to the preset value being exceeded, notify that the preset value has been exceeded.

3. The information processing apparatus according to claim 2,
wherein the processor is further configured to, in response to the preset value being exceeded, further acquire a user-specified split position, and to, in accordance with the acquired user-specified split position, split and output a set of documents for which the preset value has been exceeded.

4. The information processing apparatus according to claim 3,
wherein the processor is further configured to display the read image and the split position.

5. The information processing apparatus according to claim 4,
wherein the processor is further configured to acquire a user-specified split position, and to, in accordance with the acquired user-specified split position, perform at least one of correction, addition, and deletion of the set split position.

6. The information processing apparatus according to claim 2,
wherein the processor is further configured to stop a process in response to the preset value being exceeded, the process being a process of extracting the character string associated with the item information from the read image.

7. The information processing apparatus according to claim 6,
wherein the processor is further configured to display the read image and the split position.

8. The information processing apparatus according to claim 2,
wherein the processor is further configured to display the read image and the split position.

9. The information processing apparatus according to claim 8,
wherein the processor is further configured to acquire a user-specified split position, and to, in accordance with the acquired user-specified split position, perform at least one of correction, addition, and deletion of the set split position.

10. The information processing apparatus according to claim 1,
wherein the processor is further configured to display the read image and the split position.

11. The information processing apparatus according to claim 10,
wherein the processor is further configured to acquire a user-specified split position, and to, in accordance with the acquired user-specified split position, perform at least one of correction, addition, and deletion of the set split position.

12. The information processing apparatus according to claim 1,
wherein the processor is further configured to acquire an extraction region from which the character string is to be extracted, and to extract, from the extraction region of the read image, the character string associated with the item information.

13. The information processing apparatus according to claim 12,
wherein the extraction region is one of a plurality of extraction regions, and
wherein the processor is further configured to, if a single page includes the plurality of extraction regions, set a priority for each extraction region.

14. The information processing apparatus according to claim 12,
wherein the processor is further configured to accept a user's specification of an extraction region.

15. The information processing apparatus according to claim 12,
wherein the processor is further configured to store a region from which the character string has been extracted, and to set the stored region as the extraction region.

16. The information processing apparatus according to claim 1,
wherein the processor is further configured to
store the character string extracted from the read image, and if a character string extracted from a page of the read image differs from a character string extracted from a previous page immediately preceding the page,
compare the extracted character string with the stored character string, and
add the page containing the extracted character string to a split-out portion of the read image that contains the stored character string.

17. The information processing apparatus according to claim 16,
wherein the processor is further configured to, if the extracted character string corresponds to the stored character string, add the page of the read image containing the extracted character string to the split-out portion of the read image that contains the stored character string.

18. The information processing apparatus according to claim 16,
wherein the processor is further configured to, if the extracted character string corresponds to the stored character string, notify that the plurality of documents are not in proper order.

19. The information processing apparatus according to claim 1,
wherein the processor is further configured to, in response to extracting the character string from the read image, resume extraction from a page immediately following a page containing a last extracted character string.

20. A non-transitory computer readable medium storing a program causing a computer to execute a process for processing information, the process comprising:
acquiring a read image and item information, the read image being an image obtained by reading a paper medium including a plurality of documents, the item information being information of an item specified by a user from among a plurality of items contained in the plurality of documents;
extracting a character string from the read image, the character string being associated with the item information;
if a character string contained in a page of the read image and extracted from the page differs from a character string extracted from a previous page immediately preceding the page, setting a split position, the split position being a position at which to split out a portion of the read image as a set of documents, the portion being a portion of the read image from a page where extraction has begun to the previous page; and
outputting the read image split in accordance with the split position.

\* \* \* \* \*